(12) United States Patent
Miller et al.

(10) Patent No.: US 11,034,199 B2
(45) Date of Patent: Jun. 15, 2021

(54) SHOCK ABSORBING TRAILER COUPLER SYSTEM

(71) Applicant: Lippert Components, Inc., Elkhart, IN (US)

(72) Inventors: Trenton Miller, Goshen, IN (US); Kaleb VanOrt, Granger, IN (US); Timothy D. Schultz, Mishawaka, IN (US); Andrew Hughes, Goshen, IN (US)

(73) Assignee: Lippert Components, Inc., Elkhart, IN (US)

(*) Notice: Subject to any disclaimer, the term of this patent is extended or adjusted under 35 U.S.C. 154(b) by 271 days.

(21) Appl. No.: 16/373,963

(22) Filed: Apr. 3, 2019

(65) Prior Publication Data

US 2019/0299728 A1 Oct. 3, 2019

Related U.S. Application Data

(60) Provisional application No. 62/652,060, filed on Apr. 3, 2018.

(51) Int. Cl.
*B60D 1/24* (2006.01)
*B60D 1/50* (2006.01)
*B60D 1/14* (2006.01)

(52) U.S. Cl.
CPC .............. *B60D 1/249* (2013.01); *B60D 1/14* (2013.01); *B60D 1/50* (2013.01)

(58) Field of Classification Search
CPC .......... B60D 1/50; B60D 1/249; B60D 1/241; B60D 1/145; B60D 1/065; B60D 1/06
USPC ................ 280/483, 484, 485, 486, 489, 506
See application file for complete search history.

(56) References Cited

U.S. PATENT DOCUMENTS

| | | | |
|---|---|---|---|
| 3,630,321 A * | 12/1971 | Hollnagel | B60T 7/20 188/112 R |
| 3,897,086 A | 7/1975 | Breford | |
| 5,887,884 A * | 3/1999 | Smith | B60D 1/322 280/489 |
| 6,601,867 B2 * | 8/2003 | Carty | B60D 1/065 280/483 |
| 6,986,524 B2 | 1/2006 | Heitzmann | |
| 7,530,591 B2 | 5/2009 | Mater, Jr. et al. | |
| 7,708,300 B2 | 5/2010 | Paul et al. | |
| 7,775,544 B2 | 8/2010 | Bouwkamp | |
| 7,997,608 B2 | 8/2011 | Mater, Jr. et al. | |
| 8,100,427 B2 | 1/2012 | Mater, Jr. et al. | |
| 8,757,637 B2 | 6/2014 | Tiedge | |
| 9,156,441 B2 | 10/2015 | Tiedge | |
| 9,701,285 B2 | 7/2017 | Fiwek et al. | |
| 9,944,137 B2 | 4/2018 | Curl et al. | |

* cited by examiner

*Primary Examiner* — Ruth Ilan
*Assistant Examiner* — Hosam Shabara
(74) *Attorney, Agent, or Firm* — Nixon & Vanderhye P.C.

(57) ABSTRACT

A trailer frame includes a drawbar and a coupler connected to the drawbar through a pair of flexible and resilient connections operably disposed between the drawbar and the coupler and configured to absorb shock and vibration imparted to the drawbar and the coupler while the trailer is towed.

20 Claims, 2 Drawing Sheets

SHOCK ABSORBING TRAILER COUPLER SYSTEM

CROSS-REFERENCES TO RELATED APPLICATIONS

This application claims the benefit of U.S. Provisional Patent Application No. 62/652,060, filed Apr. 3, 2018, the entire content of which is herein incorporated by reference.

STATEMENT REGARDING FEDERALLY SPONSORED RESEARCH OR DEVELOPMENT (Not Applicable)

BACKGROUND

The present disclosure is directed to a trailer frame having a shock absorbing coupler configured to dissipate shock and vibration.

A trailer typically includes a frame having a tongue or drawbar to which a coupler is attached. The coupler is configured to be selectively connected to a hitch of a tow vehicle. The coupler typically is rigidly connected to the trailer.

During normal use of the trailer, shock and vibration may be imparted from the tow vehicle to the trailer. This shock and vibration can be detrimental to the trailer, especially in cases where a lightweight trailer is towed by a tow vehicle having a suspension designed for heavier loads. Similarly, shock and vibration can be imparted from the trailer to the tow vehicle, with corresponding detrimental effects.

SUMMARY

In an exemplary embodiment, a shock absorbing trailer coupler system includes a drawbar and a coupler. The drawbar includes a first end, a second end, and first and second spaced apart and opposed outer surfaces. The drawbar defines first and second passageways extending from the first outer surface to the second outer surface. The first passageway is relatively near the first end of the drawbar, and the second passageway is relatively far from the first end of the passageway. A first annular sleeve disposed within the first passageway extends from proximate the first outer surface to proximate the second outer surface. A second annular sleeve disposed within the second passageway extends from proximate the first outer surface to proximate the second outer surface. A first flexible and resilient annular bushing disposed within the first sleeve has a first end relatively proximate the first outer surface and a second end relatively proximate the second outer surface. A second flexible and resilient annular bushing disposed within the second sleeve has a first end relatively proximate the first outer surface and a second end relatively proximate the second outer surface. A coupler has a coupler body, which has first and second spaced apart and opposed sidewalls. The coupler defines third and fourth passageways, where the third passageway is coaxial with the first passageway, and the fourth passageway is coaxial with the second passageway. A first pin extends through the first and third passageways and the first flexible and resilient annular bushing and is secured to the drawbar and to the coupler. A second pin extends through the second and fourth passageways and the second flexible and resilient annular bushing and is secured to the drawbar and to the coupler. Both of the first and second flexible and resilient annular bushings are selectively compressible and decompressible in response to loads applied to and released from the drawbar with respect to the coupler or loads applied to and released from the coupler with respect to the drawbar.

In another exemplary embodiment, a trailer coupler system for connecting a trailer coupler to a trailer drawbar includes first and second drawbar apertures in the trailer drawbar that respectively define first and second drawbar passageways. An annular sleeve is positioned through each of the first and second drawbar passageways, and a resilient bushing is positioned in each of the annular sleeves. First and second coupler apertures in the trailer coupler respectively define first and second coupler passageways. The first and second coupler passageways are configured for alignment with the first and second drawbar passageways. First and second pins are respectively positionable through the first and second coupler passageways and the first and second drawbar passageways when the first and second coupler passageways and the first and second drawbar passageways are aligned.

In yet another exemplary embodiment, a method of assembling a trailer coupler system including a trailer coupler and a trailer drawbar includes the steps of (a) defining first and second drawbar passageways across a width of the drawbar; (b) securing an annular sleeve in each of the first and second drawbar passageways; (c) positioning a resilient bushing in each of the annular sleeves; (d) defining first and second coupler passageways in the coupler; (e) aligning the first and second coupler passageways with the first and second drawbar passageways; and (f) positioning first and second pins through the aligned first and second coupler passageways and the first and second drawbar passageways.

BRIEF DESCRIPTION OF THE DRAWINGS

These and other aspects and advantages will be described in detail with reference to the accompanying drawings, in which.

DETAILED DESCRIPTION

Figure 1:
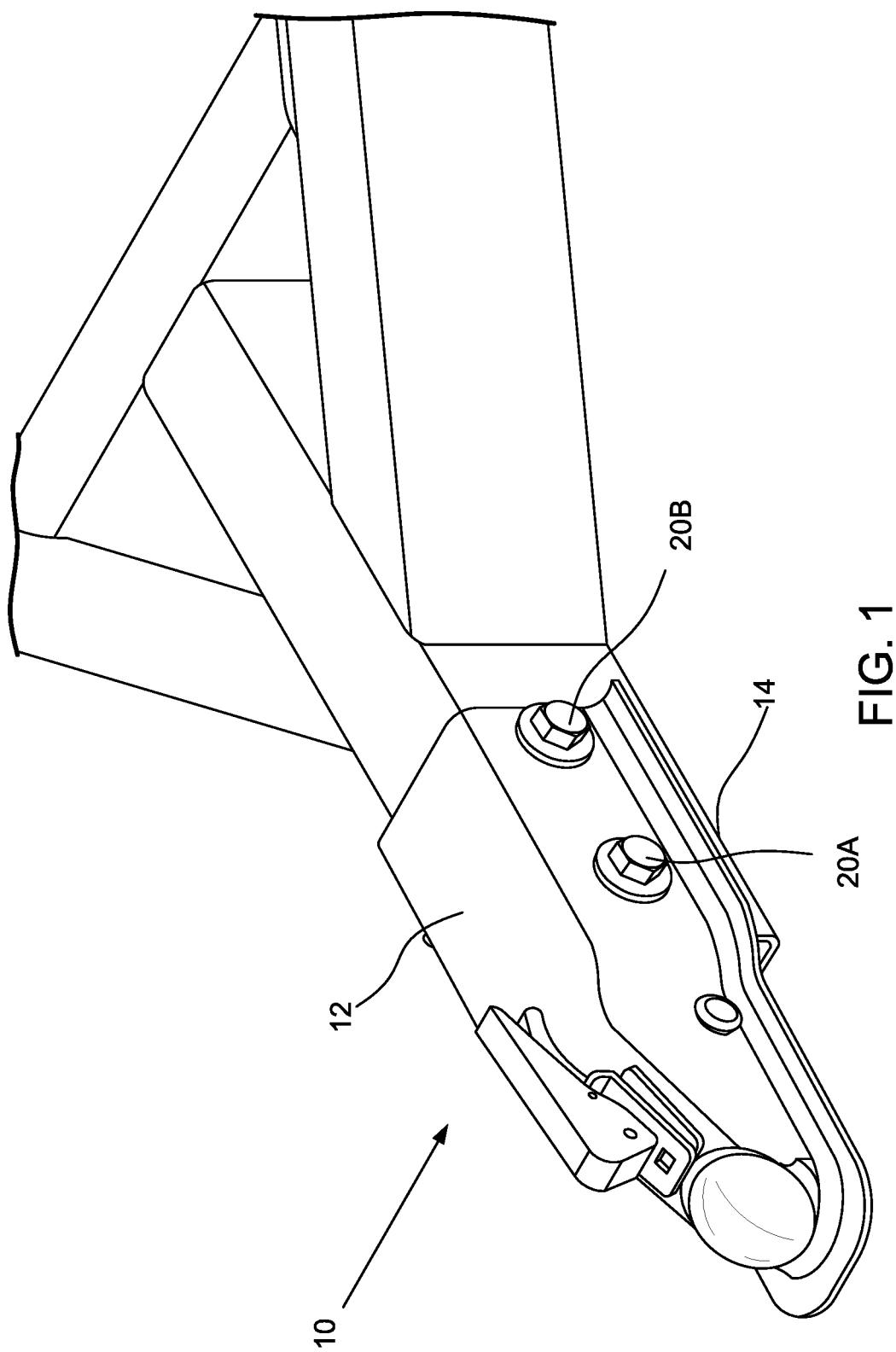
FIG. 1 is a perspective view of a shock absorbing trailer coupler system according to the present disclosure.

The drawings show an illustrative shock absorbing trailer coupler system 10 according to the present disclosure. The system 10 includes a trailer coupler 12, a trailer drawbar 14, first and second annular sleeves 16A, 16B disposed in respective apertures in the drawbar, first through fourth flexible and resilient bushings 18A, 18B, 18C, 18D disposed within the sleeves 16A, 16B, and first and second pins 20A, 20B disposed within the bushings and respective apertures in the coupler.

The trailer coupler 12 may be any suitable form of trailer coupler. As shown, the trailer coupler 12 is a conventional, ball-type trailer coupler having a top plate 22, first and second side plates 24, 26 depending from the top plate, and a ball-receiving portion 28. The top plate 22 cooperates with the first and second side plates 24, 26 to define an interior space 30 configured to receive a first (or forward) end of the drawbar 14. The first side plate 24 defines first and second coupler apertures 32, 34 therethrough, and the second side plate 26 defines third and fourth coupler apertures 36, 38 therethrough. The first and third coupler apertures 32, 36 are coaxially aligned with each other, and they cooperate to define a first lateral coupler passageway through the first and second side plates 24, 26 of the coupler 12. Similarly, the second and fourth coupler apertures 34, 38 are coaxially aligned with each other, and they cooperate to define a second lateral coupler passageway through the first and second side plates 24, 26 of the coupler 12. The first and second coupler passageways cooperate to define a plane that is generally parallel to the top plate 22 of the coupler 12. In other embodiments, the first and second coupler passageways may cooperate to define a plane that is oriented otherwise. In an embodiment, the coupler 12 may be made of steel.

The drawbar 14 is shown as a square tube having an upper wall 40, a lower wall 42 spaced from and parallel to the upper wall, a first side wall 44 perpendicular to each of the upper wall and the lower wall, and a second side wall 46 spaced from and parallel to the first side wall. In an embodiment, the drawbar 14 similarly may be made of steel. The first side wall 44 defines first and second drawbar apertures 48, 50 therethrough, and the second side wall 46 defines third and fourth drawbar apertures 52, 54 therethrough. Each of the first through fourth drawbar apertures 48, 50, 52, 54 has a corresponding diameter. The first and third drawbar apertures 48, 52 cooperate to define a first lateral drawbar passageway through the drawbar 14, and the second and fourth drawbar apertures 50, 54 cooperate to define a second lateral drawbar passageway through the drawbar. The first and second drawbar passageways cooperate to define a plane that is generally parallel to the upper and lower walls 40, 42 of the drawbar 14. In other embodiments, the first and second drawbar passageways may cooperate to define a plane that is oriented otherwise. The perpendicular distance between the first and second drawbar passageways is the same as the perpendicular distance between the first and second coupler passageways.

The first annular sleeve 16A is received in the first and third drawbar apertures 48, 52, and the second annular sleeve 16B is received in the second and fourth drawbar apertures 50, 54 in a similar manner. Each of the first and second sleeves 16A, 16B has a length, an outer diameter complementary to the diameter of the corresponding first through fourth drawbar aperture 48, 50, 52, 54, and an inner diameter. The outer diameters of the sleeves 16A, 16B and the diameters of the first through fourth drawbar apertures 48, 50, 52, 54 may be selected so that each of the sleeves may be snugly received within the corresponding drawbar apertures. Each of the sleeves 16A, 16B may have first and second ends flush with or slightly protruding from or short of the outer face of the corresponding first and second drawbar side walls 44, 46. Each of the sleeves 16A, 16B may be made of steel. Each of the sleeves 16A, 16B may be welded to the drawbar 14.

In the embodiment shown, an insert bar 17A, 17B may be respectively disposed within each of the sleeves 16A, 16B. Each of the flexible and resilient bushings 18A, 18B, 18C, 18D has a cylindrical shaft 56 and a thin, circular, and planar head 58. The shaft 56 and the head 58 cooperate to define a T-shaped profile. The shaft 56 of each of the bushings 18A-18D has an outer diameter complementary to the inner diameters of the respective sleeve 16A, 16B so that the shaft 56 may be inserted into a corresponding sleeve in a snug-fit (i.e., friction fit) relationship. The first bushing 18A may be inserted into a first end of the first sleeve 16A, and the third bushing 18C may be inserted into a second end of the first sleeve. Similarly, the second bushing 18B may be inserted into a first end of the second sleeve 16B, and the fourth bushing 18D may be inserted into a second end of the second sleeve 16B. Additionally, the bushings 18A-18D are sized to fit over the insert bars 17A, 17B such that the bushings 18A-18D are sandwiched between the sleeves 16A, 16B and the insert bars 17A, 17B. With the bushings 18A-18D so inserted into the sleeves 16A, 16B, the shaft side of the head 58 of each bushing 18A-18D may lie flat against the surface of the corresponding side wall 44, 46 of the drawbar 14.

Figure 2:
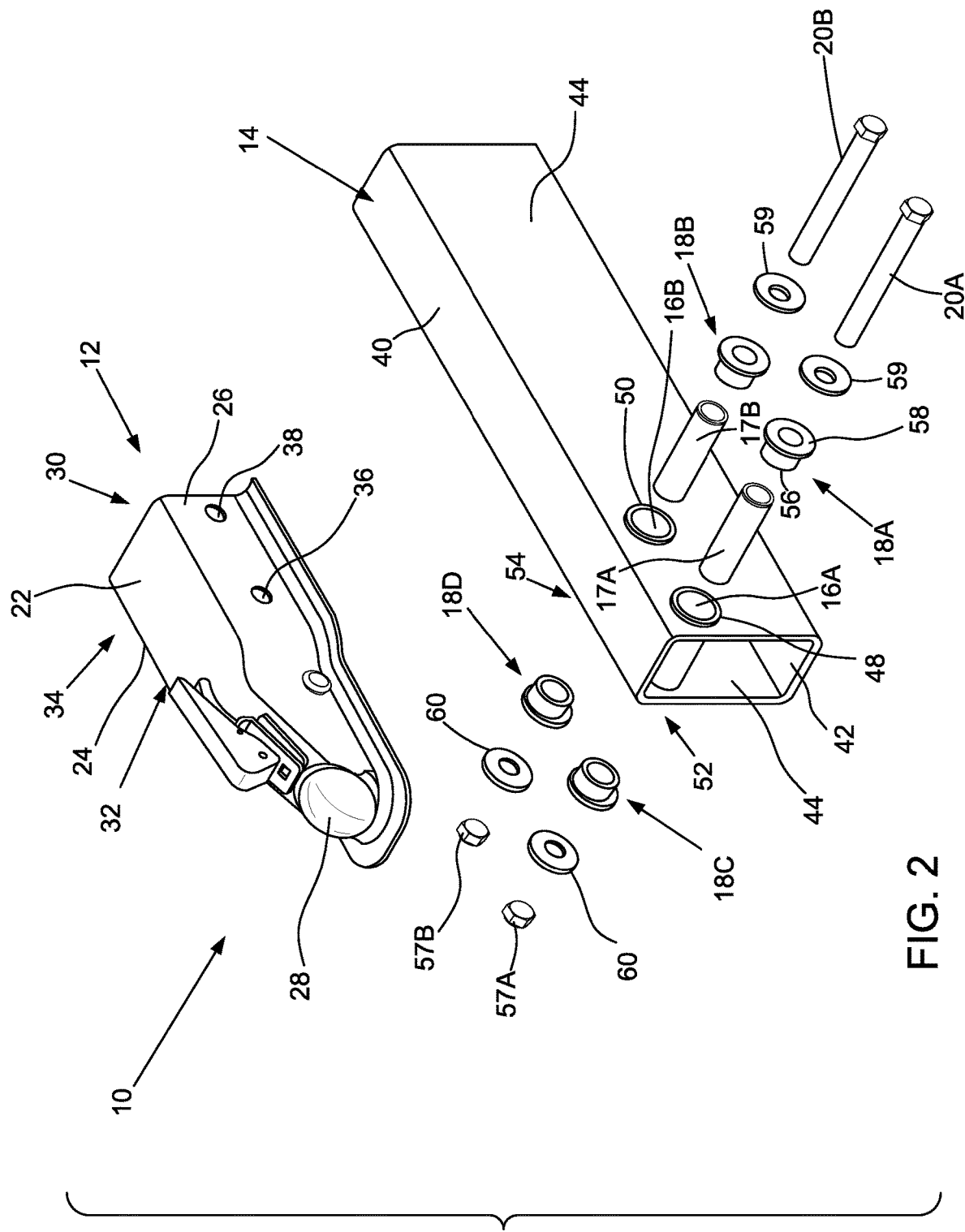
FIG. 2 is an exploded perspective view of a shock absorbing trailer coupler system according to the present disclosure.

In an embodiment, the head 58 of one or more of the bushings 18A, 18B, 18C, 18D could be omitted. In such an embodiment, a washer of suitable material, for example, rubber, steel, or plastic, may be provided in lieu of the omitted head(s). In FIG. 2, a washer 59 is shown in addition to the head 58. A similar washer 60 may be provided on the opposite side of the drawbar 14 between the nuts 56A, 56B and the bushings 18C, 18D.

In an embodiment, a single bushing with a single planar head or no head could replace the first and third bushings 18A, 18C. Similarly, a single bushing with a single planar head or no head could replace the second and fourth bushings 18B, 18D. In such an embodiment, a washer of suitable material, for example, rubber, steel, or plastic, may be provided in lieu of the omitted head(s).

The coupler 12 may be assembled to the drawbar 14 by coaxially aligning the first and second coupler passageways with the first and second drawbar passageways, inserting the first pin 20A through the first and third coupler apertures 32, 36 and the first and third bushings 18A, 18C via the insert bar 17A, and inserting the second pin 20B through the second and fourth coupler apertures 34, 38 and the second and fourth bushings 18B, 18D via the insert bar 17B. In an embodiment, the pins 20A, 20B could be shoulder bolts or other bolts, and corresponding nuts 57A, 57B could be threaded onto the ends of the bolts extending from the third and fourth coupler apertures 36, 38 to secure the bolts to the assembly.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A shock absorbing trailer coupler system comprising:
   a drawbar having a first end, a second end, and first and second spaced apart and opposed outer surfaces, the drawbar defining first and second passageways extending from the first outer surface to the second outer surface, the first passageway being relatively near the first end of the drawbar and the second passageway being relatively far from the first end of the passageway;
   a first annular sleeve disposed within the first passageway, the first annular sleeve extending from proximate the first outer surface to proximate the second outer surface;
   a second annular sleeve disposed within the second passageway, the second annular sleeve extending from proximate the first outer surface to proximate the second outer surface;
   a first flexible and resilient annular bushing disposed within the first sleeve, the first flexible and resilient annular bushing having a first end relatively proximate the first outer surface and a second end relatively proximate the second outer surface;
   a second flexible and resilient annular bushing disposed within the second sleeve, the second flexible and resilient annular bushing having a first end relatively proximate the first outer surface and a second end relatively proximate the second outer surface;
a coupler having a coupler body, the coupler body having first and second spaced apart and opposed sidewalls, the coupler defining third and fourth passageways, the third passageway being coaxial with the first passageway, and the fourth passageway being coaxial with the second passageway;
a first pin extending through the first and third passageways and the first flexible and resilient annular bushing and secured to the drawbar and to the coupler; and
a second pin extending through the second and fourth passageways and the second flexible and resilient annular bushing and secured to the drawbar and to the coupler,
wherein both of the first and second flexible and resilient annular bushings are selectively compressible and decompressible in response to loads applied to and released from the drawbar with respect to the coupler or loads applied to and released from the coupler with respect to the drawbar.

2. The system of claim 1 wherein the first end of the first flexible and resilient annular bushing protrudes from the first outer surface.

3. The system of claim 1 further comprising a third flexible and resilient annular bushing disposed within the first sleeve, the third flexible and resilient annular bushing having a first end relatively proximate the second outer surface and a second end relatively proximate the first outer surface.

4. The system of claim 3 wherein the first end of the third flexible and resilient annular bushing protrudes from the second outer surface.

5. The system of claim 4 wherein the second end of the first flexible and resilient annular bushing abuts the second end of the third flexible and resilient annular bushing.

6. The system of claim 1 wherein the first pin is configured as a first bolt having a threaded shank portion, the system further comprising a nut threadingly engaged with the threaded shank portion.

7. The system of claim 1 wherein the coupler may move both translationally and pivotally with respect to the drawbar in response to compression and decompression of the first and second flexible and resilient annular bushings.

8. The system of claim 1 wherein compression and decompression of the first and second flexible and resilient annular bushings allows the coupler to move both translationally and pivotally with respect to the drawbar.

9. The system of claim 1 wherein the drawbar comprises an elongated tubular structure having first and second spaced apart and opposed sidewalls defining, respectively, the first and second spaced apart and opposed outer surfaces.

10. The system of claim 1 further comprising a first insert bar disposed in the first annular sleeve and through the first flexible and resilient annular bushing, and a second insert bar disposed in the second annular sleeve and through the second flexible and resilient annular bushing.

11. A trailer coupler system for connecting a trailer coupler to a trailer drawbar, the trailer coupler system comprising:
first and second drawbar apertures in the trailer drawbar, the first and second drawbar apertures respectively defining first and second drawbar passageways;
an annular sleeve positioned through each of the first and second drawbar passageways;
a resilient bushing positioned in each of the annular sleeves;
first and second coupler apertures in the trailer coupler, the first and second coupler apertures respectively defining first and second coupler passageways, wherein the first and second coupler passageways are configured for alignment with the first and second drawbar passageways; and
first and second pins respectively positionable through the first and second coupler passageways and the first and second drawbar passageways when the first and second coupler passageways and the first and second drawbar passageways are aligned.

12. The system of claim 11, wherein the annular sleeves are made of steel.

13. The system of claim 12, wherein the annular sleeves are welded in the first and second drawbar passageways.

14. The system of claim 11, wherein the resilient bushings comprise a first bushing inserted into one side of the each of the annular sleeves and a second bushing inserted into an opposite side of each of the annular sleeves.

15. The system of claim 11, wherein the resilient bushings are respectively secured in the annular sleeves in a friction fit.

16. The system of claim 11, wherein the first and second flexible and resilient annular bushings are configured such that compression and decompression thereof allows the coupler to move both translationally and pivotally with respect to the drawbar.

17. The system of claim 11, further comprising an insert bar disposed in each of the annular sleeves and through the resilient bushings.

18. A method of assembling a trailer coupler system including a trailer coupler and a trailer drawbar, the method comprising:
(a) defining first and second drawbar passageways across a width of the drawbar;
(b) securing an annular sleeve in each of the first and second drawbar passageways;
(c) positioning a resilient bushing in each of the annular sleeves;
(d) defining first and second coupler passageways in the coupler;
(e) aligning the first and second coupler passageways with the first and second drawbar passageways; and
(f) positioning first and second pins through the aligned first and second coupler passageways and the first and second drawbar passageways.

19. The method of claim 18, wherein the annular sleeves are made of steel, and wherein step (b) is practiced by welding the annular sleeves in the first and second drawbar passageways, respectively.

20. The method of claim 18, further comprising positioning first and second insert bars in the annular sleeves and through the resilient bushings.

* * * * *